United States Patent Office 2,904,536
Patented Sept. 15, 1959

2,904,536
POLYAMIDE CONTAINING INTERLINEAR PIPERAZINE UNITS

John E. Reith, Wilmington, Del., assignor to E. I. du Pont de Nemours and Company, Wilmington, Del., a corporation of Delaware No Drawing. Application June 29, 1955
Serial No. 518,952

6 Claims. (Cl. 260—78)

This invention relates to a novel and useful product and to a process for its preparation. More particularly it relates to a polyamide, the shaped structures of which exhibit high acid dye sensitivity.

It is an object of the present invention to provide a novel, fiber-forming polycarbonamide.

Another object is to provide a process for preparing a novel fiber-forming polycarbonamide.

A further object is to provide an acid-dye sensitive shaped structure produced from a polycarbonamide.

These and other objects will become apparent in the course of the following specification and claims.

In accordance with the present invention a novel fiber-forming carbonamide is produced by copolymerizing a compound of the formula

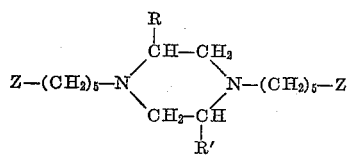

wherein R and R' are members of the class consisting of hydrogen and lower alkyl, Z being a member of the class consisting of carboxyl and

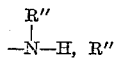

being hydrogen or lower alkyl, with polyamide forming reactants, preferably those of the class consisting of hexamethylene diamine and adipic acid, the amide forming derivatives thereof, and epsilon-caprolactam. The polymerization is continued by conventional techniques until fiber-forming characteristics are obtained. A preferred method for obtaining the product of this invention, is to form a salt from adipic acid and N,N'-bis(aminopentyl)-piperazine, or N,N'-bis(aminopentyl) 2,5-dimethylpiperazine or alternatively to form a salt from hexamethylene diamine and piperazine-N,N'-dicaproic acid, or 2,5-dimethylpiperazine-N,N'-dicaproic adding the salt to hexamethylenediammonium adipate in quantities of generally 0.2 to 5 mole percent, but preferably from 1 to 2.5% and then polymerizing the salt mixture. When epsilon-caprolactam is substituted for hexamethylenediammonium adipate, the adjuvant is preferably in a concentration of from 0.2 to 0.8 mole percent.

The following examples are cited to illustrate the invention. They are not intended to limit it in any way. The "parts" expressed are "parts by weight." Dye bath component composition is based on the weight of the fabric dyed.

Example I

A charge of 582 parts of piperazine hydrate, 105 parts of delta-chlorovaleronitrile, 700 parts sodium carbonate, 1750 parts of water, and 4 parts of potassium iodide, as catalyst, are heated at reflux with stirring for 10 hours. After cooling to room temperature, the reaction mixture is extracted with benzene and the benzene extract distilled under reduced pressure. The product is N,N'-bis-(cyanobutyl)piperazine, a dinitrile having a melting point of 68 to 70° C., and a boiling point of 180°–184° C. at 0.1 to 0.3 mm.

257 parts of the dinitrile mixed with 100 parts of liquid ammonia and 40 parts Raney cobalt catalyst are hydrogenated at 135° C. and about 1800 pounds/sq. in. pressure. Upon removal of the catalyst, the product N,N'-bis(aminopentyl)piperazine having a boiling point of 148–152 (0.2 to 0.4 mm.), and a melting point of 42–44° C. is distilled under reduced pressure.

The adipic acid salt of the diamine is prepared by adding a solution of 652 parts of the diamine and 500 parts of absolute alcohol to a solution of 365 parts of adipic acid and 4,000 parts absolute alcohol. After cooling, the salt is collected by filtration, washed once with cold alcohol and several times with dry ether and air dried. Melting point 190–192° C.

95 parts of an aqueous solution containing 50% by weight of the above salt is placed in an evaporator with 4,000 parts of an aqueous solution containing 50% by weight hexamethylenediammonium adipate and 22 parts of acetic acid. The mixture is evaporated to a total solids content of 75% and then, while hot, charged into a nitrogen purged autoclave. During the first half hour of the polymerization cycle the system is closed while the temperature is raised to 200° C. A pressure of 250 pounds per square inch is maintained for an additional 5 hours while the temperature is slowly increased to 280° C. Pressure is then reduced to atmospheric over a 1½ hour period, the temperature being permitted to rise to 285° C. After maintaining this temperature for about 2 hours, the polymerization product is extruded as a ribbon, quenched with water and cut into flake.

The copolymer is steam spun in the apparatus described in United States Patent No. 2,571,975 through a 13-hole spinneret maintained at 294° C. and collected as a 40 denier, 13 filament yarn at a wind-up speed of 1206 yards per minute. After being drawn 3 times its extruded length with the apparatus described in United States Patent No. 2,289,232, it is observed to have a tenacity of 5.0 grams per denier and a 25% elongation.

Knit tubing prepared from the above yarn is dyed by immersion for one hour at the boil in an aqueous bath containing the following:

2.0% Anthraquinone Green (C.I. 1078)
2.0% sodium lauryl sulfate
10.0% ammonium sulfate The bath to fabric ratio is maintained at 50:1 (bath: fabric). The fabric is then scoured in water containing 2.0% sodium lauryl sulfate for 15 minutes at 75° C., rinsed and dried. It is observed to have been dyed a dark green.

When a similar tubing of polyhexamethyleneadipamide yarn is subjected to the same dyeing technique as described above, it acquires only a light shade of green.

Example II

A reactor is charged with 171 parts of 2,5-dimethylpiperazine, 432 parts of 90% chlorovaleronitrile, 318 parts sodium carbonate, 1,000 parts of water, and 2 grams potassium iodide as catalyst. The mixture is heated at reflux with stirring for 10 hours. After cooling to room temperature, the reaction mixture is extracted with benzene and the benzene extract distilled under reduced pressure. The product is N,N'-bis(cyanobutyl)2,5-dimethylpiperazine having a melting point of 66 to 67° C. and a boiling point of 175° to 180° C. at 0.10–0.30 mm.

The nitrile is hydrogenated to N,N'-bis(aminopentyl)2,5-dimethylpiperazine following the hydrogenation technique of Example I. The salt of this amine with adipic acid is then formed and it is polymerized with hexamethylenediammoniumadipate in accordance with the polymerization procedure of Example I and spun into yarn as taught above.

Knit tubing prepared from the yarn produced is dyed according to the method of Example I employing an aqueous dyebath containing:

2.0% Anthraquinone Blue SWF (C.I. Pr 12)
2.0% sodium lauryl sulfate
10.0% ammonium sulfate The sample dyes a deep blue.

*Example III*

Epsilon-chlorocapronitrile is substituted for chlorovaleronitrile in the condensation described in Example II. The product N,N'-bis(cyanopentyl)2,5-dimethylpiperazine is then hydrolyzed to 2,5-dimethylpiperazine-N,N'-dicaproic acid. A salt of this acid with hexamethylene diamine is prepared in an aqueous medium. This salt is polymerized with hexamethylenediammoniumadipate and spun into yarn as taught in Example I.

The yarn so prepared is knitted into tubing, a swatch of which is dyed following the technique of Example I in an aqueous bath containing:

2.0% Pontamine Fast Red 8BLX (C.I. 278)
2.0% sodium lauryl sulfate
10.0% ammonium sulfate The swatch is dyed a deep red.

*Example IV*

The 2,5-dimethyl piperazine of Example III is replaced with piperazine. The piperazine-N,N'-dicaproic acid prepared by hydrolysis of the dinitrile is employed in polymer preparation, spun into yarn, knitted into tubing and thereafter dyed, all as taught in Example III replacing 2,5-dimethylpiperazine-N,N'-dicaproic acid. The tubing dyes to a deep red.

*Example V*

0.4 part of the adipic acid salt of N,N'-bis(aminopentyl)piperazine is mixed with 178 parts of epsilon-caprolactam. 1249 parts of water is then added. The slurry is placed in a nitrogen purged autoclave. The system is closed to the atmosphere and the temperature is raised until an autogenous pressure of 250 pounds per square inch is attained. At this point the temperature is 190° C. A pressure of 250 pounds is maintained by bleeding off steam while the temperature is slowly raised to 272° C. This temperature is then maintained while the system is bled down to atmospheric pressure. Heating is continued for an additional hour at atmospheric pressure. After extruding and quenching the reaction mass, it is washed by being stirred for one hour at about 90° C. in water and thereafter dried in air.

The polymer, prepared as described above, is spun employing the equipment and technique of Example I (but with a spinneret temperature of 272° C.) to produce a 40 denier 13 filament yarn. This yarn, and fabrics produced therefrom, are dyed in the manner taught in Example I to a dark green.

The shaped articles prepared from the polymer of the present invention exhibit a high sensitivity to acid dyes and acid-dyed textiles produced therefrom show good wash-fastness. Among acid dyes which are suitable may be mentioned the sodium bisulphite salt of parasulfo-benzene-azo-beta-naphthol (C.I. 152), the toluene-para-sulphonyl esters (C.I. 430), the sodium salt of toluene-para-sulphonyl-ether of 4-para-hydroxybenzene-azo-1-para-chloro-orthosulpho-phenyl-3-methyl-5-hydroxy-pyrazol (C.I. 642), the sulphonic acids of dialkylamino-phenylamino-phenyl-naphthophenazonium chloride (C.I. 833) and the sodium salt of 1:4-di-ortho-sulpho-para-tolylaminoanthraquinone (C.I. 1078). These dyes are applied by conventional techniques.

The product of the present invention may be described as a copolyamide wherein recurring carbonamide groups are separated by a minor proportion of divalent radicals of the formula

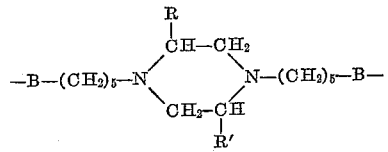

wherein R and R' are members of the class consisting of hydrogen and lower alkyl and B is a member of the class of

and

wherein R'' is a member of the class consisting of hydrogen and lower alkyl. Preferably the major proportion of divalent radicals separating recurring carbonamide groups are $-(CH_2)_n-$ wherein $n$ is an integer between 3 and 7. While it is preferred to prepare such a polymer by the melt copolymerization of either the hexamethylenediamine salt of piperazine- or 2,5-dimethyl-piperazine-N,N'-dicaproic acid, or the adipic acid salt of N,N'-bis(aminopentyl)piperazine or N,N'-bis(aminopentyl)2,5-dimethyl piperazine, with either hexamethylenediammonium adipate or epsilon-caprolactam, interphase polymerization techniques may also be employed. By an "interphase" polymerization is meant a process whereby the diamine in one liquid phase and the acid chloride in a second liquid phase immiscible with the first phase, are mixed, at least one of the phases including a liquid diluent, the admixture being maintained until the condensation polymerization has occurred to the extent desired. Such a process is described in United States application Ser. No. 226,065, filed May 12, 1951.

While the invention is particularly of value in the preparation of copolyamides wherein the major proportion of divalent radicals separating recurring carbonamide groups are $-(CH_2)_n-$ wherein $n$ is an integer between 3 and 7, as expressed above, the copolyamide containing a minor proportion (i.e., no more than about 10 mol percent) of the divalent -N,N'-(pentamethylene)piperazine and substituted piperazine, may also be prepared employing other fiber-forming polyamide-producing reactants. A valuable class of reactants for use are diamines of the formula $NH_2-A-NH_2$ and dicarboxylic acids of the formula $HOOC-A'-COOH$ amino carboxylic acids of the formula $HOOC-A''-NH_2$ in which A, A' and A'' are divalent hydrocarbon radicasl free from aliphatic unsaturation and in which each of A, A' and A'' has a chain length of at least 2 carbons. Especially useful reactants within this group are those in which A is $(CH_2)_x$, A' is $(CH_2)_y$ and A'' is $(CH_2)_z$ where $x$ is at least 4, $y$ is at least 3 and $z$ is at least 5. Mixtures of various diamines, diacids, etc. may also be employed.

In the formation of copolyamide by melt polymerization the reactants may be heated together with suitable means employed to remove water formed in the reaction. Diamine is employed in substantially equimolar proportions to the total dibasic acid present during the reaction. The copolymeric products may be formed directly from the corresponding monomers or one homopolymer may be added to polymerizable co-reactants, distribution of the desired units entering the products via amide interchange. Formation of the desired diamine salts of the various dibasic acids prior to melt polymerization assists in control of the reaction. The conventional polyamide melt polymerization cycle is suitable as is illustrated in the examples. Catalytic materials, viscosity stabilizers, pigments and the like may also be present. The melt polymerization is conducted under conditions to prevent oxidation, that is, the presence of oxygen should be avoided and a slow stream of an inert gas, for example, nitrogen or hydrogen, is advantageously passed through and/or over the molten mass. During the polymerization the melting point and the viscosity of the melt gradually increase. The temperature is maintained high enough to keep the mass in the molten state during this heating period. Heating is continued with removal of water of reaction at least until a filament is formed when a rod is touched to the melt and thereafter drawn away. The polymer is conveniently removed from the reaction vessel in molten form, and subsequently cooled. The extruded material is then formed into blocks, chips and the like suitable for feed to melt spinning equipment.

After formation of the fiber-forming copolymer, it may be shaped into filamentary form by conventional spinning techniques. Usually it is spun by extrusion of the melt. After extrusion the filaments can be cold (or hot) drawn to several times their extruded length to produce molecularly oriented structures. Fibers formed are of good strength and highly pliable.

The yarns produced in accordance with the present invention are suitable for the usual textile applications. They may be employed in the knitting or weaving of fabrics of all types as well as in the production of non-woven, felt-like products produced by known methods.

Many other modifications within the spirit of the invention will be apparent to those skilled in the art from a reading of the above without a departure from the inventive concept.

What is claimed is:

1. A synthetic linear fiber-forming polymer selected from the group consisting of poly(hexamethylene adipamide) and poly(epsilon caproamide) containing in the polymer chain at least about 0.2 mol percent of a divalent radical of the formula

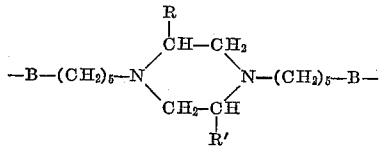

wherein R and R' are members of the class consisting of hydrogen and lower alkyl and B is a divalent radical of the class of

and

wherein R'' is a member of the class consisting of hydrogen and lower alkyl.

2. Poly(hexamethylene adipamide) containing in the polymer chain at least about 0.2 mol percent of a divalent radical of the formula

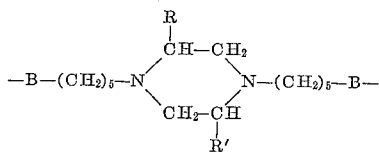

wherein R and R' are members of the class consisting of hydrogen and lower alkyl and B is a divalent radical of the class of

and

wherein R'' is a member of the class consisting of hydrogen and lower alkyl.

3. Poly(epsilon caproamide) containing in the polymer chain at least about 0.2 mol percent of a divalent radical of the formula

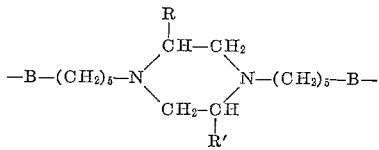

wherein R and R' are members of the class consisting of hydrogen and lower alkyl and B is a divalent radical of the class of

and

wherein R'' is a member of the class consisting of hydrogen and lower alkyl.

4. The polymer of claim 2 wherein the divalent radical is present in amounts of from 0.2 to 5.0 mol percent.

5. The polymer of claim 2 wherein the divalent radical is present in amounts of from 1 to 2.5 mol percent.

6. The polymer of claim 3 wherein the divalent radical is present in amounts of from 0.2 to 0.8 mol percent.

References Cited in the file of this patent
UNITED STATES PATENTS

| | | |
|---|---|---|
| 2,274,831 | Hill | Mar. 3, 1942 |
| 2,423,460 | McQueen | July 8, 1947 |
| 2,631,993 | Morgan | Mar. 17, 1953 |

OTHER REFERENCES

Hill et al.: "Journal of Polymer Science," vol. 3, No. 5, pp. 609–630, October 1948. (Copy in Sci. Libr.)